United States Patent
Kamath et al.

(10) Patent No.: US 10,868,728 B2
(45) Date of Patent: Dec. 15, 2020

(54) GRAPH-BASED NETWORK MANAGEMENT

(71) Applicant: Hewlett Packard Enterprise Development LP, Houston, TX (US)

(72) Inventors: Harish B. Kamath, Bangalore (IN); Vijay Vishwanath Hegde, Bangalore (IN); Deepak Khungar, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 162 days.

(21) Appl. No.: 16/108,745

(22) Filed: Aug. 22, 2018

(65) Prior Publication Data
US 2020/0067783 A1     Feb. 27, 2020

(51) Int. Cl.
*H04L 12/24*     (2006.01)
*H04L 12/26*     (2006.01)
*H04L 12/46*     (2006.01)

(52) U.S. Cl.
CPC ............ *H04L 41/12* (2013.01); *H04L 41/142* (2013.01); *H04L 41/22* (2013.01); *H04L 43/045* (2013.01); *H04L 43/08* (2013.01); *H04L 12/4641* (2013.01)

(58) Field of Classification Search
CPC ....... H04L 41/12; H04L 41/142; H04L 41/22; H04L 43/045; H04L 43/08
See application file for complete search history.

(56) References Cited

U.S. PATENT DOCUMENTS

| | | |
|---|---|---|
| 9,306,864 B2 | 4/2016 | Thakkar et al. |
| 9,436,443 B2 | 9/2016 | Chiosi et al. |
| 2009/0046732 A1* | 2/2009 | Pratt, Jr. ................. H04L 45/34 370/406 |
| 2009/0245243 A1* | 10/2009 | Rangarajan ........... H04L 45/302 370/389 |
| 2012/0321052 A1* | 12/2012 | Morrill ................... H04L 67/18 379/32.01 |
| 2013/0058215 A1 | 3/2013 | Koponen et al. |
| 2016/0043927 A1 | 2/2016 | Larson |

(Continued)

OTHER PUBLICATIONS

Ribeiro, T.A. et al.; "Design and Implementation of a Consistent Data Store for a Distributed SDN Control Plane"; Sep. 2016; 13 pages.

*Primary Examiner* — Sargon N Nano
*Assistant Examiner* — Christopher B Robinson
(74) *Attorney, Agent, or Firm* — Hewlett Packard Enterprise Patent Department

(57) ABSTRACT

Example techniques of network infrastructure management are described. In an example, a network statistics request may be received by a network device. The network statistics request indicates a network resource and a network statistics attribute to be determined for the network resource. The network resource is one of a node and a data path in the network infrastructure. The network statistics attribute is indicative of information on flow of data packets at the network resource. A graph is generated based on the network statistics request. The graph depicts vertices corresponding to nodes in a network segment associated with the network resource and edges corresponding to communication links between pairs of adjacent nodes in the network segment. Based on the graph and a network statistics attribute for a pair of adjacent nodes, the network statistics attribute for the network resource, may be determined.

14 Claims, 8 Drawing Sheets

(56) References Cited

U.S. PATENT DOCUMENTS

2017/0310574 A1   10/2017  Wolting
2018/0063608 A1*   3/2018  Prakash ............. H04Q 11/0066
2018/0160281 A1*   6/2018  Zweig .................... G06F 17/16

* cited by examiner

NETWORK DEVICE 100

PROCESSOR(S) 102

MEMORY 104

[[RECEIVE A NETWORK STATISTICS REQUEST, THE NETWORK STATISTICS REQUEST INDICATING A NETWORK RESOURCE AND A NETWORK STATISTICS ATTRIBUTE TO BE DETERMINED FOR THE NETWORK RESOURCE, THE NETWORK RESOURCE BEING ONE OF A NODE AND A DATA PATH IN THE NETWORK INFRASTRUCTURE, THE NETWORK STATISTICS ATTRIBUTE BEING INDICATIVE OF INFORMATION ON FLOW OF DATA PACKETS AT THE NETWORK RESOURCE;

GENERATE A GRAPH BASED ON THE NETWORK STATISTICS REQUEST, THE GRAPH DEPICTING: VERTICES CORRESPONDING TO NODES IN A NETWORK SEGMENT ASSOCIATED WITH THE NETWORK RESOURCE; AND EDGES, WHEREIN EACH EDGE CORRESPONDS TO A COMMUNICATION LINK BETWEEN A PAIR OF ADJACENT NODES IN THE NETWORK SEGMENT; AND

DETERMINE, BASED ON THE GRAPH AND A NETWORK STATISTICS ATTRIBUTE FOR A PAIR OF ADJACENT NODES, THE NETWORK STATISTICS ATTRIBUTE FOR THE NETWORK RESOURCE, TO MANAGE THE NETWORK INFRASTRUCTURE, THE NETWORK STATISTICS ATTRIBUTE FOR THE PAIR OF ADJACENT NODES BEING DETERMINED BASED ON DATA PACKETS TRANSCEIVED BY THE PAIR OF ADJACENT NODES.
]]

Fig. 1

| Counter value table | | | |
|---|---|---|---|
| Source Address | Destination Address | Packet Count | Traffic volume (KB) |
| M1 | M2 | C1 | V1 |
| M2 | M1 | C2 | V2 |
| M1 | M3 | C3 | V3 |
| M3 | M1 | C4 | V4 |

| Counter value table | | | |
|---|---|---|---|
| Source Address | Destination Address | Packet Count | Traffic volume (KB) |
| M2 | M3 | C5 | V5 |
| M3 | M2 | C6 | V6 |
| M3 | M4 | C7 | V7 |
| M4 | M3 | C8 | V8 |

| Counter value table ||||
| Source Port Address | Destination Port Address | Packet Count | Traffic volume (KB) |
|---|---|---|---|
| P1 | P5 | C9 | V9 |
| P2 | P5 | C10 | V10 |
| P3 | P6 | C11 | V11 |
| P4 | P7 | C12 | V12 |

GRAPH-BASED NETWORK MANAGEMENT

BACKGROUND

A computer network may have a variety of resources which may be utilized for computation, storage, and connectivity in the computer network. Network infrastructure comprising such resources, enables data exchange between users, devices, processes, applications, services, and networks. The network infrastructure may be managed by network administrators based on information on flow of data packets in the network infrastructure, for proper operation and connectivity in the network infrastructure. p

BRIEF DESCRIPTION OF DRAWINGS

The following detailed description references the drawings, wherein:

FIG. 1 illustrates a network device for managing the network infrastructure, according to an example;

DETAILED DESCRIPTION

Figure 2:
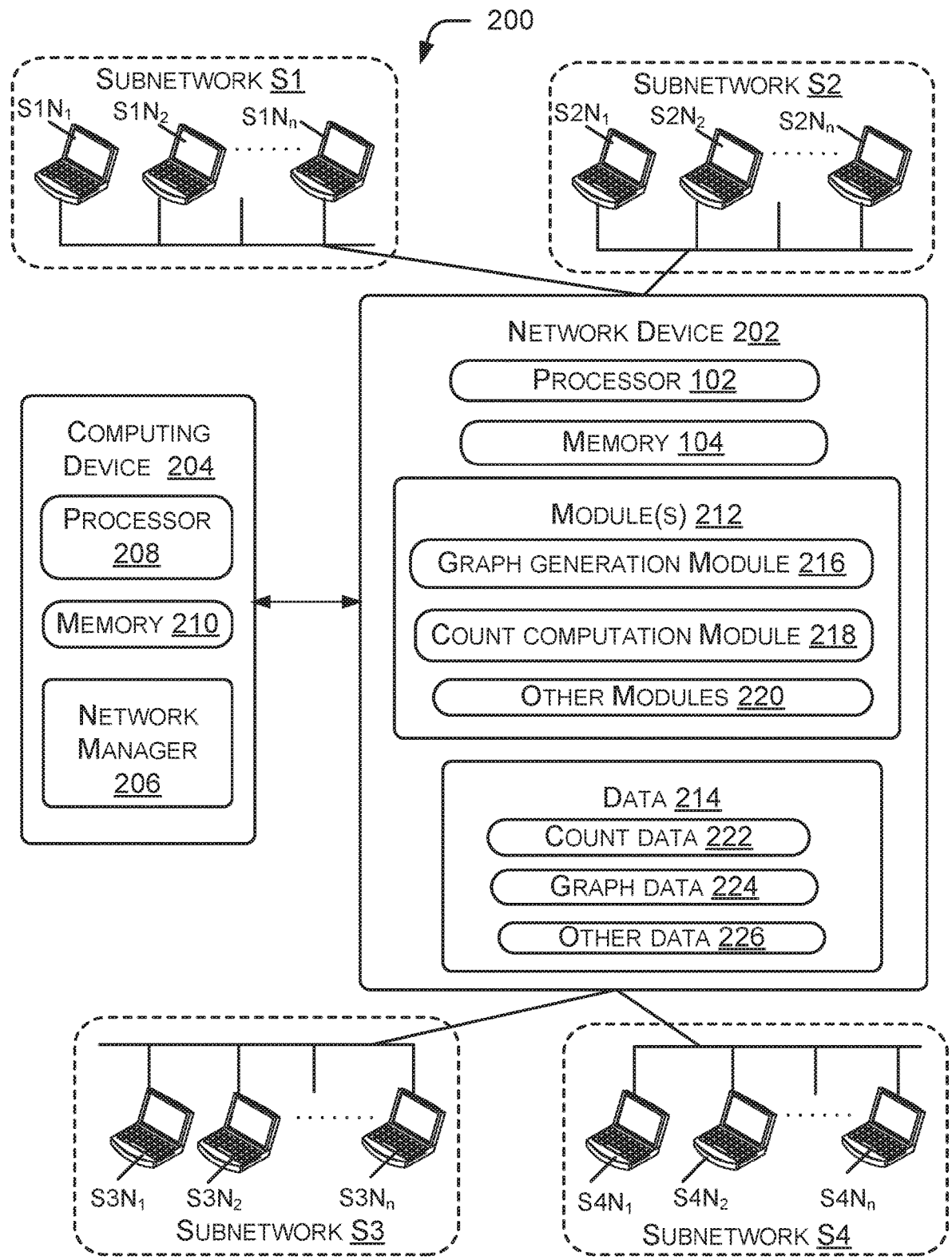
FIG. 2 illustrates a network infrastructure managed by the network device, according to an example.

Network statistics may include information with regard to flow of data packets in a network infrastructure. Network statistics, such as data packet counts, data traffic volume, data frame counts, broadcast packet counts, and dropped packet counts may be used for monitoring the network infrastructure to obtain patterns of network behavior and thereby enabling deployment and configuration of resources, such as servers, storage, and networking components, in the network infrastructure. Analysis of network statistics may provide patterns of workload movement, bandwidth usage, load on broadcast domains, direction of data traffic, etc. in the network infrastructure.

Network statistics relating to the resources are generally processed, analyzed and stored in a networking component. The networking component includes a device that has data storage, data routing, and data forwarding capabilities. Examples of the networking component includes, network switches, top of rack switches, routers, hubs, gateways, interconnect modules (ICMs), or the like. In some techniques, the network statistics are stored in a table-based architecture, such as Ternary Content Addressable Memory (TCAM) or Hash tables. Often, individual table entries of values of the network statistics corresponding to each resource in the network infrastructure, may be stored in the table-based architecture. This may lead to a considerable amount of storage space of the networking component to be consumed. Further, with network virtualization, resources and data traffic may increase and the storage space of the networking component may be consumed at a faster rate. Further, with increased data traffic, fetching of the network statistics from the storage space of the networking component may be complex and time consuming.

The present subject matter relates to managing a network infrastructure based on network statistics. In the present subject matter, network statistics attributes may be determined based on a graph which provides relevant information for determining network statistics attributes without adversely affecting the storage capacity of the networking component. By organizing information relevant to determining the network statistics attributes in the graph, comparatively less storage space of the networking component may be consumed for storing the network statistics attribute(s) for different resources.

Example implementations of the present subject matter for managing a network infrastructure based on network statistics are described. In an example, a network statistics request may be received by a network device in a network infrastructure. The network device has compute, storage, and networking capabilities. The network device may be a network switch or an ICM. In an example, the network statistics request is received from a computing device. The computing device may implement a network infrastructure management platform which includes applications and processes that can configure, monitor, and provide management, monitoring and configuration services to resources in the network infrastructure. In an example, the network infrastructure management platform may be a converged infrastructure management platform.

The network statistics request indicates a network resource and a network statistics attribute to be determined for the network resource. The network resource may be a component in the network infrastructure having compute, storage, and networking capabilities. The network resource includes a node and/or a data path in the network infrastructure. The node is a connection point that can receive, create, store or send data along distributed routes in a computer network. The node may be a redistribution point or a communication endpoint. A data path may be a connected route between two nodes, such as, a source node and a destination node, where data packets originate from the source node to be communicated to the destination node. In an example, a data path may be bidirectional. A node and/or a data path corresponds to a layer of a network stack in the network infrastructure. The network stack (also called protocol stack) refers to an implementation of a computer networking protocol suite. Individual protocols within a protocol suite are often directed to perform separate types of functions. Thus, each protocol in the protocol stack may be considered as an abstraction layer (or a layer) in a stack of protocols. Every layer adds more features and capability to the protocol suite. The network statistics request may indicate a node and/or a data path corresponding to any of the layers and a network statistics attribute to be determined for the indicated node or data path. The network statistics attribute is indicative of information on flow of data packets at the network resource. Examples of the network statistics attribute include transceived data packets, transceived traffic volume, and transceived data frames. In some examples, prior to receiving the network statistics request, the network device may be configured to manage one or more network resources, also referred to as managed network resources. The network statistics request may indicate the managed network resources or some of the managed network resources for which network statistics attributes are to be determined.

Based on the network statistics request, a graph may be generated. The graph refers to a non-linear data structure, which contains a set of points called vertices and a set of lines or edges connecting the vertices. The graph may depict a network segment associated with the network resource. The graph includes vertices corresponding to nodes in the network segment and edges corresponding to communication links between pairs of adjacent nodes in the network segment. Thus, the graph defines a relationship between nodes and communication links in the network segment associated with the network resource for which the network statistics attribute is to be determined. The network segment refers to a portion of the network infrastructure that is separated from the network infrastructure by network devices, such as switches, hubs, bridges, routers, etc. Each network segment may include multiple computers and other devices.

The network statistics attribute is determined for each pair of adjacent nodes in the graph, based on data packets transceived by the pair of adjacent nodes. In an example, a pair of adjacent nodes correspond to a data path for flow of data packets. In an example, a counter may be configured to determine the network statistics attribute for the pair of adjacent nodes. A value of the counter associated with the network statistics attribute of the pair of adjacent nodes is updated based on one of a data packet being transceived by one of the adjacent nodes. The counter associated with a network statistics attribute of the pair of adjacent nodes may store a numerical value which gives a quantitative measure of the network statistics attribute relevant to the pair of adjacent nodes. In an example, a counter may be associated with a network statistics attribute that indicates a transceived data packet count for the pair of adjacent nodes. When a source and a destination address, as mentioned in a packet header of a data packet, received at the network device, match with addresses of the pair of adjacent nodes for which the network statistics attribute(s) is to be determined, then the value stored in the counter is updated. Thus, the network statistics attribute may be determined for the pair of adjacent nodes, based on the value of the counter.

Thus, counters may be configured for each pair of adjacent nodes in the graph and the network statistics attribute may be determined for each pair of adjacent nodes. The values of the network statistics attribute for the pair of adjacent nodes may be stored in a table-based architecture of the network device. The network statistics attribute for the network resource may be determined, based on the graph and the network statistics attribute for the pair of adjacent nodes. The network statistics attribute determined for the network resource may be provided to the network infrastructure management platform in the computing device for managing the network infrastructure.

Thus, in the present subject matter, the network statistics attribute(s) may be determined for any specific network resource based on a graph depicting a network segment associated with the specific network resource and the network statistics attribute(s) for pairs of adjacent nodes in the graph. Therefore, individual table entries of values of the network statistics attribute(s) corresponding to each and every network resource may not be stored in the table-based architecture, unlike in some general techniques. Thus, consumption of storage space in the network device may be reduced which may allow better performance of the network device.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a network device 100 for managing a network infrastructure, according to an example. The network device 100 may be a network switch. In an example, the network device 100 may have networking capabilities to connect one or more servers to datacenter networks. In some examples, the network device 100 may be an ICM connecting blade servers in an enclosure to datacenter networks.

The network device 100 includes a processor 102 and a memory 104 coupled to the processor 102. The memory 104 stores instructions executable by the processor 102. The instructions when executed by the processor 102 cause the processor 102 to receive a network statistics request from a computing device (not shown). In some examples, the computing device may implement a network infrastructure management platform which can provide reports depicting patterns of bandwidth usage, workload movement, data traffic direction, etc., based on network statistics sourced from the network device 100, for managing the network infrastructure. In an example, the computing device may implement a network infrastructure management platform which may generate the network statistics request based on a user input in the network infrastructure management platform. In an example, the network infrastructure management platform may be a converged infrastructure platform.

The network statistics request may indicate a network resource, such as at least one of a node and a data path in a layer of a network stack in the network infrastructure, for which a network statistics attribute is to be determined. Each protocol in the network stack may be considered as an abstraction layer (or a layer) in a stack of protocols. For example, in the Open Systems Interconnection (OSI) model, there are seven layers, such as datalink layer, network layer, and transport layer. The network statistics request may indicate a node or a data path corresponding to any of the layers and a network statistics attribute to be determined for the indicated node or data path. In an example, the network statistics request may indicate multiple nodes and data paths, and multiple network statistics attributes to be determined for the indicated nodes/data paths. In some examples, the network statistics request may indicate network resources which may be pre-configured, based on user inputs, as managed network resources. The network statistics request may indicate the managed network resources for which network statistics attributes are to be determined.

The node may be a redistribution point or a communication endpoint. In an example, in the context of the datalink layer (layer 2) of the OSI model, a node may be an electronic device, such as a network interface card, having a physical address, such as a Media Access Control (MAC) address, in a Virtual Local Area Network (VLAN). In another example, in the context of the network layer (layer 3) of the OSI model, a node may be an electronic device, such as a computer, a router, and a switch, having a logical address, such as an Internet Protocol (IP) address in a Transmission Control Protocol (TCP)/Internet Protocol (IP) network. In another example, in the context of the transport layer (layer 4) of the OSI model, a node may be a logical port having a TCP/User Datagram Protocol (UDP) port number. In an example, a node may be specified in the network statistics request by mentioning a network segment under which the node is grouped and a unique identifier, such as a MAC address, an IP address, or a TCP/UDP port number. A data path may be a connected route between two nodes through which data packets may be transferred. In an example, a data path may be specified in the network statistics request by mentioning addresses of two nodes and a subnetwork under which the two nodes are grouped. One of the two nodes may act as a source node while the other acts as a destination node.

The network statistics attribute is representative of information associated with flow of data packets at the network resource. Examples of the network statistics attribute of a node and a data path include: transceived data packets indicating a total number of data packets either transmitted or received by the node or transferred over the data path, transceived traffic volume indicating total bytes of data either transmitted or received by the node or transferred over the data path, and transceived data frames indicating a total number of data frames either transmitted or received by the node or transferred over the data path.

Other examples of the network statistics attributes for a node include Tx packets, Rx packets, Tx jumbo frames, Rx jumbo frames, Tx traffic volume, Rx traffic volume, broadcast Tx, broadcast Rx, multicast Tx, multicast Rx, dropped Tx, dropped Rx, Internet Small Computer System Interface (ISCSI) Tx packets, and ISCSI Rx packets. Tx packets and Rx packets indicate a number of data packets transmitted or received by the node. Tx jumbo frames and Rx jumbo frames indicate a number of jumbo frames transmitted or received by the node. Tx traffic volume and Rx traffic volume indicate bytes of data transmitted or received by the node. Dropped Tx indicate number of data packets transmitted by the node which are dropped in transit and dropped Rx indicating number of data packets destined to reach the node which are dropped in transit. Broadcast Tx and broadcast Rx indicate a number of broadcast data packets transmitted or received by the node. Multicast Tx and multicast Rx indicate a number of multicast data packets transmitted or received by the node. ISCSI Tx packets and ISCSI Rx packets indicate the number of data packets transmitted or received by the node using the ISCSI protocol. Similar examples of network statistic attributes may be applicable for the data path.

On receiving the network statistics request, a graph may be generated. The graph depicts vertices corresponding to nodes in a network segment associated with the network resource and edges, where each edge corresponds to a communication link between a pair of adjacent nodes in the network segment. The network segment may be a broadcast domain of a layer in a network stack implemented in the network infrastructure. In an example, when a device with a specific MAC address is indicated in the network statistics request, the network segment may be a Virtual Local Area Network (VLAN) under which the device is grouped. In another example, when a node is indicated in the network statistics request with a specific IP address, the network segment may be an IP subnet under which the IP address indicated in the network statistics request is grouped. In some examples, the network statistics attribute may indicate a broadcast domain, such as a specific VLAN for which the network statistics attribute is to be determined. In such examples, the graph depicts the broadcast domain, with nodes of the broadcast domain as vertices of the graph and communication link between two adjacent nodes as edges. In an example, the graph may be updated for subsequent network statistics request(s) or based on changes in the network infrastructure, such as creation and/or deletion of additional nodes, data paths, and network segments.

The network statistics attribute may be determined for the pair of adjacent nodes, based on data packets transceived by the pair of adjacent nodes. In an example, counters may be configured for the pair of adjacent nodes to capture the network statistics attribute for the adjacent nodes. In an example, the counter includes a transceived data packet counter which stores a numerical value indicative of one of a number of data packets transferred between the pair of adjacent nodes. In another example, the counter includes a transceived traffic volume counter which stores a numerical value in bytes indicative of a total size of data packets transferred between the pair of adjacent nodes. Other examples of the counter include Tx jumbo frames counter, Rx jumbo frames counter, Tx traffic volume counter, Rx traffic volume counter, broadcast Tx counter, broadcast Rx counter, multicast Tx counter, multicast Rx counter. Each of these counters are associated with corresponding network statistics attributes described earlier.

The network statistics attribute may be determined for the network resource based on the graph and the network statistics attribute for the pair of adjacent nodes. The network statistics attribute may be provided to the computing device or other devices or applications for managing the network infrastructure.

In the present subject matter, network statistics attribute(s) for each of the network resources, such as, a node, a data path, and a broadcast domain may not be stored as an entry in a table in the network device. Rather, a network statistics attribute for any network resource may be determined based on the graph depicting the network segment associated with the network resource and by utilizing values of the network statistics attribute(s) for adjacent pair of nodes in the graph. Since, the values of the network statistics attributes for each of the network resource may not be stored in the table-based architecture, there may be a reduction in consumption of storage space of the network device thereby enhancing the performance of the network device.

FIG. 2 illustrates a network infrastructure 200 managed by a network device 202, according to an example of the present subject matter. The network infrastructure 200 may include servers, storage devices, switches, routers, hubs, gateways, interconnects, network sockets and physical and logical ports for transfer of data over the network infrastructure 200. In an example, the network device 202 may be a network switch or an ICM that enables connection between servers and Storage Area Networks (SANs), such as a datacenter networks.

The network device 202 is coupled to a computing device 204 over the network infrastructure 200. In an example, the computing device 204 may be a computer which in communication with the network device 202 is used to manage the network infrastructure 200. The computing device 204 includes a network manager 206, which, in an example, may implement a converged infrastructure management platform. In an example, the converged infrastructure management platform may create a logical interconnect group to manage the network infrastructure 200. A logical interconnect group is representation of an entity that includes configuration of one ICM or multiple ICMs in an enclosure.

As shown in FIG. 2, the network infrastructure 200 may include subnetworks, S1, S2, S3, and S4. A subnetwork may be a logical division of a computer network, in which the nodes can communicate with each other. In an example, a subnetwork may be a VLAN in the context of layer 2 or an IP subnet in the context of layer 3. The subnetwork S1 includes nodes $S1N_1$, $S1N_2$, ..., $S1N_n$, the subnetwork S2 includes nodes $S2N_1$, $S2N_2$, ..., $S2N_n$, the subnetwork S3 includes nodes $S3N_1$, $S3N_2$, ..., $S3N_n$, and the subnetwork S4 includes nodes $S4N_1$, $S4N_2$, ..., $S4N_n$. The network device 202 may enable connectivity between the nodes in the subnetworks S1 to S4. With the network device and method(s) of the present subject matter, network statistics attribute(s) may be determined for any of such nodes as shown in FIG. 2. The network statistics attribute(s) may also be determined for any data path between two nodes or any subnetwork. Although, in FIG. 2, four subnetworks are shown, there may be more than four or less than four subnetworks. Further, the network device 202 may also enable connectivity between storage area networks (SANs), servers, and other devices in the network, which are not shown in FIG. 2. Further, although, the network infrastructure 200 is shown to include a single network device, in an example, there may be multiple network devices present in the network infrastructure 200.

The network device 202 includes the processor 102 coupled to a memory 104. The computing device 204 includes a processor 208 coupled to a memory 210. The processor(s) 102 and 208 may be implemented as microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions stored in the memory 104. The processor 208 is configured to fetch and execute computer-readable instructions stored in the memory 210.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The memories 104 and 210 may include any computer-readable medium known in the art including, for example, volatile memory (e.g., RAM), and/or non-volatile memory (e.g., EPROM, flash memory, etc.). Modules 212 and data 214 may reside in the memory 104. The modules 212 can be implemented as instructions stored on a computer readable medium and executable by a processor and/or as hardware. The modules 212 include routines, programs, components, data structures, and the like, which perform particular tasks or implement particular abstract data types.

The modules 212 include a graph generation module 216 which corresponds to instructions stored on a computer readable medium and executable by a processor to generate a graph depicting a network segment based on adjacency lists or adjacency matrices. The modules 212 include a count computation module 218 which corresponds to instructions stored on a computer readable medium and executable by a processor to associate counters with a node or a data path, update counter values, process counter values, etc. The modules 212 also comprise other modules 220 that supplement applications on the network device 202, for example, modules of an operating system.

The data 214 serves, amongst other things, as a repository for storing data that may be fetched, processed, received, or generated by the modules 212. The data 214 includes count data 222 which stores values of counters corresponding to network statistics attributes for nodes and data paths and graph data 224 which includes graphs depicting network segments. The data 214 also comprises other data 226 corresponding to the other modules 220.

In operation, a network statistics request may be received by the network device 202 from the computing device 204. In an example, the network statistics request may be generated on user inputs being receiving by the network manager 206, which may implement a network infrastructure management platform. In an example, the network statistics request may indicate a node and/or a data path for which a network statistics attribute is to be determined. The node and/or the data path for which the network statistics attribute is to be determined, may be provided by the user inputs.

In some examples, the network statistics request may indicate multiple nodes or data paths and multiple network statistics attributes to be determined for the indicated nodes or data paths. The network statistics request may indicate a node of a subnetwork, such as an endpoint of a VLAN, or a host of an IP subnet, for which network statistics attributes are to be determined. In an example, the network statistics request may indicate a specific MAC address identifying an endpoint grouped under a specific VLAN id for which the network statistics attributes are to be determined. In some examples, the network statistics request may indicate the endpoints grouped under a specific VLAN id for which the network statistics attributes are to be determined. In some examples, the network statistics attribute may indicate a list of VLANs for which the network statistics attribute is to be determined. In other examples, the network statistics request may indicate a specific IP address identifying a host of a specific IP subnet for which the network statistics attributes are to be determined. In some examples, the network statistics request may indicate a specific TCP/UDP port identified through its port number mapped under a specific IP subnet for which the network statistics attributes are to be determined.

In some examples, a data path may be specified in the network statistics request by mentioning an address of the source node and an address of the destination node and a subnetwork to which the source and destination node belongs. The nodes and the data paths and the corresponding network statistics attributes to be determined may vary depending on layers of a protocol stack in the network infrastructure. In an example, the network statistics request may also indicate a time duration for which the node or the data path is to be monitored for determining values of the network statistics attributes.

Network statistics attributes may represent information associated with flow of data packets at the node and/or the data path. Examples of the network statistics attributes for a node include Tx packets, Rx packets, Tx jumbo frames, Rx jumbo frames, Tx traffic volume, Rx traffic volume, broadcast Tx, broadcast Rx, multicast Tx, multicast Rx, dropped Tx, dropped Rx, Internet Small Computer System Interface (ISCSI) Tx packets, and ISCSI Rx packets.

Consider that the network statistics request indicates a node for which network statistics attributes, viz., a packet count indicative of the total number of packets transmitted and/or received by the node and a traffic volume indicative of a total amount of data in bytes transmitted and/or received by the node, is to be determined. In an example, the node may be a device grouped under a specific VLAN. The network statistics request may specify the MAC address, say M1, of the node and a VLAN id, say VLAN 100, of the specific VLAN.

On receiving the network statistics request, the graph generation module 216 may identify that the network resource for which the network statistics request is to be determined is a specific node with a MAC address, say M1, and is grouped under a network segment, say VLAN 100. In an example, the network segment associated with the network resource may be specified in the network statistics request and the graph generation module 216 may identify the network segment associated with the network resource from the network statistics request. In some examples, the graph generation module 216 may identify the network segment associated with the network resource having MAC address M1 by referring to MAC-VLAN mapping tables which may be stored as part of control plane of the network device 202. The control plane includes architecture of the network device 202 that performs the functions related to determining the route of data packets passing through the network device 202.

Figures 3A, 3B, 3C:
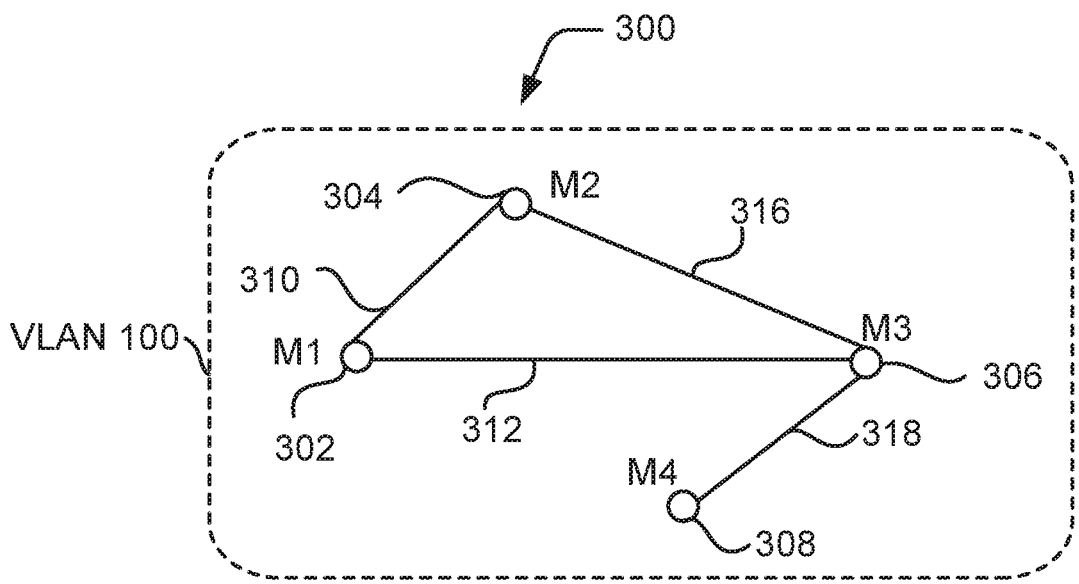
FIG. 3A illustrates a graph depicting a Virtual Local Area Network (VLAN) in the network infrastructure, according to an example.
FIG. 3B illustrates a counter value table, according to an example.
FIG. 3C illustrates another counter value table, according to an example.

The graph generation module 216 generates a graph 300, as shown in FIG. 3A, depicting the nodes of the network segment, VLAN 100. The graph generation module 216 may generate the graph 300 using adjacency lists or adjacency matrices. The adjacency lists or adjacency matrices may be implemented through a linked list datastructure, such as a singly linked list or a doubly linked list. The vertices 302, 304, 306, and 308 of the graph 300, correspond to nodes grouped under VLAN 100 and edges 310, 312, 316, and 318 correspond to communication links between each pair of adjacent nodes. With reference to FIG. 3, the nodes 302, 304, 306, and 308 has MAC addresses M1, M2, M3, and M4, respectively. The network statistics attribute(s) are to be determined for the node 302, as per the network statistics request.

In an example, the graph may be updated based on subsequent network statistics requests or based on changes in the network infrastructure, such as creation and/or deletion of additional nodes, data paths, and network segments. In an example, the graph generation module 216 may update the graph on receiving a user input to add/delete a node to the network segment. The graph generation module 216 may also dynamically update the graph based on detecting the change in the network infrastructure 200. In an example, the graph generation module 216 may detect the change in the network infrastructure 200 by analyzing data packet headers of data packets passing through the network device 202.

The graph generation module 216 may determine a plurality of edges in the graph 300 which are incident to the vertex corresponding to the node 302. An edge incident to the node 302 is any edge which has the node 302 as an endpoint, i.e., the node 302 is either a source node or a destination node. Thus, with reference to FIG. 3, the plurality of edges incident on the node 302 are, the edges 310 and 312. Each of such incident edges may be represented by a corresponding pair of adjacent nodes, such as (M1:M2) and (M1:M3). Here the pair of adjacent nodes are represented by their respective MAC addresses.

The count computation module 218 may determine the network statistics attribute for the pair of adjacent nodes. In an example, the count computation module 218 may associate a counter with data paths formed by the pair of adjacent nodes. The value of the counter may be computed based on data packets being transceived between the pair of adjacent nodes. Computation of a value of a counter includes the count computation module 218 modifying the value of the counter based on occurrence of an event. In an example, when a source and a destination address of a data packet received at the network device 202, match with addresses of the pair of adjacent nodes, then the count computation module 218 determines the occurrence of the event. On determining the occurrence of the event, the count computation module 218 may update the values of counters associated with the network statistics attribute(s), such as Packet count and traffic volume. For each pair of adjacent nodes, (M1:M2) and (M1:M3), the values of the network statistics attribute(s) may be determined and stored in a table, such as the counter value table 314 shown in FIG. 3B. As can be seen from FIG. 3B, the network statistics attributes, Packet count and Traffic volume are computed for the adjacent nodes. With reference to FIG. 3B, the packet counts for M1→M2, M2→M1, M1→M3, and M3→M1 are C1, C2, C3, and C4, respectively. The traffic volumes for M1→M2, M2→M1, M1→M3, and M3→M1 are V1, V2, V3, V4, respectively. In other examples, different network statistics attributes, such as Broadcast Tx, multicast Rx, dropped Rx, Rx jumbo frames, etc., may also be computed.

The count computation module 218 may add the network statistics attribute(s) for each of the corresponding pair of adjacent nodes to obtain the network statistics attribute(s) for the node 302. Thus, the packet count of the node 302 is C1+C2+C3+C4 and the traffic volume is V1+V2+V3+V4.

In another example, consider that the network statistics request indicates a specific data path for which network statistics attributes, viz., a packet count and a traffic volume, are to be determined. The data path may be identified by addresses of two nodes grouped under a specific VLAN. Say, the network statistics request specifies the data path by MAC addresses of two nodes M2 and M4. Here the two nodes, are referenced by their respective MAC addresses. The specific data path identified by the nodes (M2:M4) may be a bidirectional data path. As per the network statistics request, a packet count indicative of the total number of data packets transferred over the data path and a traffic volume indicative of a total amount of data in bytes transferred over the data path, is to be determined.

The graph generation module 216 may identify that the two nodes M2 and M4 are grouped under the network segment, VLAN 100. The network segment under which the nodes of the specific data path are grouped may be mentioned in the network statistics request, or the graph generation module 216 may identify the network segment from information stored in the control plane or management plane of the network device 202. The graph generation module 216 may then generate the graph 300, as shown in FIG. 3B, depicting the nodes, viz., M1, M2, M3, and M4, of VLAN 100. The graph 300 may be generated based on adjacency lists or adjacency matrices.

From the graph 300, the graph generation module 216 may determine a set of edges of the graph 300 that links the two nodes, M2 and M4. Each edge of the set of edges may be represented by a corresponding pair of adjacent nodes. With reference to FIG. 3A, the set of edges that links the two nodes M2 and M4 are represented by the pair of adjacent nodes as [(M2:M3) and (M3:M4)]. Here the pair of adjacent nodes are referenced by their respective MAC addresses. (M2:M3) is the pair of adjacent nodes representing the edge 316 and (M3:M4) is the pair of adjacent nodes representing the edge 318.

The count computation module 218 may determine the network statistics attribute for the pair of adjacent nodes. In an example, the count computation module 218 may associate counter(s) with the pair of adjacent nodes. The value of the counter(s) may be computed based on data packets being transferred between the pair of adjacent nodes (M2:M3) and (M3:M4). The values of the counter(s) of the network statistics attribute(s) may be determined and stored in a table, such as the counter value table 320 shown in FIG. 3C. With reference to FIG. 3C, the packet counts for M2→M3, M3→M2, M3→M4, and M4→M3 are C5, C6, C7, and C8, respectively. The traffic volumes for M2→M3, M3→M2, M3→M4, and M4→M3 are V5, V6, V7, V8, respectively.

The count computation module 218 may add the network statistics attribute for each of the corresponding pair of adjacent nodes to obtain the network statistics attribute for the specific data path (M2:M4). Thus, the packet count for the data path (M2:M4) is C5+C6+C7+C8 and the traffic volume for the data path (M2:M4) is V5+V6+V7+V8. Therefore, by employing the described method, a separate table entry for recording and storing the network statistics attributes for the specific data path (M2:M4) may be eliminated. Similarly, with a greater number of nodes and data paths, there may be a greater reduction in the number of separate table entries for recording and storing the network statistics attributes for specific nodes and data paths. With the present method, the network statistics attributes for any node or data path may be obtained from the network statistics attributes of some other nodes or data paths and the relationship between the nodes/data paths as depicted in a graph, such as the graph 300.

In some examples, the network statistics request may indicate a specific VLAN, say VLAN 100 for which network statistics attributes, viz., the packet count and the traffic volume, is to be determined. The graph generation module 216 may identify the network segment as VLAN 100 from the network statistics request. The graph generation module 216 may generate the graph 300, as shown in FIG. 3A, where vertices 302-308 of the graph 300 correspond to nodes of VLAN 100 and edges 310, 312, 316, and 318 correspond to communication links between adjacent nodes.

The count computation module 218 may determine the network statistics attribute for each pair of adjacent nodes. Each pair of adjacent nodes may be represented as a bidirectional data path between two nodes. With reference to FIG. 3A, the Packet count and Traffic volume may be determined for each of the data paths (M1:M2), (M1:M3), (M2:M3), and (M3:M4), which are a set of adjacent nodes that constitute the VLAN 100.

The count computation module 218 may determine the packet count for VLAN 100 as ΣPacket counts for [(M1:M2); (M1:M3); (M2:M3); (M3:M4)] and the Traffic volume for VLAN 100 as ΣTraffic volume for [(M1:M2); (M1:M3); (M2:M3); (M3:M4)]. In some examples, the network statistics request may indicate a list of VLANs for which multiple network statistics attributes are to be determined. Similar methods, as described above, may be used for determining the network statistics attributes for each VLAN in the list of VLANS.

Although in the description of the FIGS. 3A-3C, a packet count and traffic volume is determined, other network statistics attributes, such as Broadcast Tx, multicast Rx, dropped Rx, Rx jumbo frames etc., may also be determined in a similar manner. Further, although, FIGS. 3A-3C show two network statistics attributes determined for a specific node or data path, in other examples less than two or more than two network statistics attributes may be determined.

In some examples, a network statistics request may also indicate a data path specified in the context of layer 3 IP addresses and/or layer 4 TCP/UDP port addresses of host devices connected using an IP network. In an example, a network statistics request may indicate address of a source node as IP1 and an address of a destination node as IP2 thereby indicating a data path IP1→IP2. Consider that TCP/UDP port addresses P1, P2, P3, and P4 are mapped to the source node having IP address IP1. Also consider that TCP/UDP port addresses P5, P6, and P7 are mapped to the destination node having IP1 address IP2.

Figures 4A, 4B:
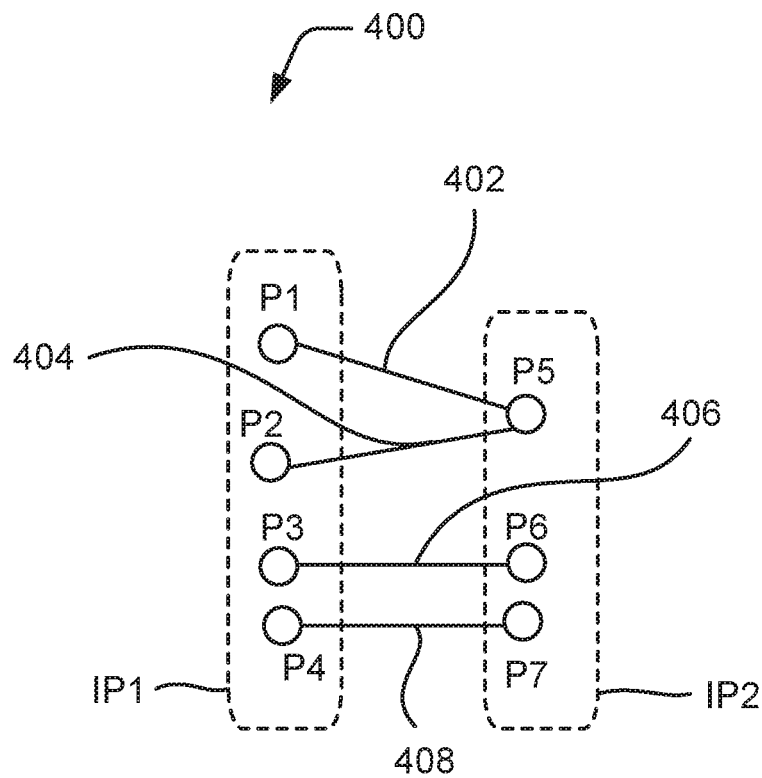
FIG. 4A illustrates a graph depicting connection of logical ports in an Internet Protocol (IP) network, according to an example.
FIG. 4B illustrates a counter value table, according to an example.

On receiving such a network statistics request, the graph generation module 216 may identify that the network resource for which the network statistics attributes are to be determined, is a specific data path between the source node having address IP1 and the destination node having address IP2. The graph generation module 216 may generate a graph 400, as shown in FIG. 4A, which provides a relationship between the source and the destination node and associated TCP/UDP ports. The graph may be implemented as an adjacency matrix or an adjacency list.

With reference to FIG. 4A, the graph 400 depicts vertices P1, P2, P3, P4, P5, P6, and P7 corresponding to the TCP/UDP ports and edges 402, 404, 406, and 408 corresponding to communication links between the TCP/UDP ports. The graph generation module 216 may determine a set of edges that links the source node having IP address IP1 with the destination node having IP address IP2. With reference to FIG. 4A, each of the set of edges are represented by a corresponding pair of adjacent nodes, viz. [(P1:P5), (P2:P5), (P3:P6), (P4:P7)].

The count computation module 218 may associate counters with network statistics attributes for data paths identified by the pairs of adjacent nodes. Thus, counters may be associated to determine network statistics attributes, such as, Packet count and traffic volume in the data paths P1→P5, P2→P5, P3→P6, and P4→P7. The count computation module 218 may compute the counter values for each of the mentioned data paths on transit of data packets through the data paths. The values of the network statistics attributes may be determined and stored in a table, such as the counter value table 410 shown in FIG. 4B. As can be seen from FIG. 4B, the network statistics attributes, Packet count and Traffic volume are computed for the adjacent nodes.

The count computation module 218 may add the network statistics attributes for each of the corresponding pair of adjacent nodes to obtain the network statistics attributes for the data path IP1→IP2. Thus, for the data path IP1→IP2, the packet count is C9+C10+C11+C12 and the traffic volume is V9+V10+V11+V412. Therefore, by employing the described method, a separate table entry for recording and storing the network statistics attributes for the specific data path IP1→IP2 may be eliminated. Further, in some examples, the network statistics request may indicate that the network statistics attributes are to be determined for Secure Shell (SSH) sessions in the data path IP1→IP2. Consider that the port P5 is a destination port in the IP2 network that handles the SSH sessions. Therefore, from the counter value table 410, the count computation module 218 may determine the Packet count for the SSH sessions in the data path IP1→IP2 as C9+C10 and the traffic volume for the SSH sessions in the data path IP1→IP2 as V9+V10. Thus, separate calculation, processing, and storing of values of the network statistics attributes for determining network statistics for the SSH sessions may be avoided.

Although, in the counter value table 410, the packet count or traffic volume for the data path IP1→IP2 is computed as an aggregate of values stored for the TCP/IP ports mapped to the respective IP subnets, however, in some examples, the IP1→IP2 Packet Count may differ from the aggregate packet counts or traffic volume for the TCP/IP ports. In such examples, the IP1→IP2 packet counts and P1-P7 packet counts may be stored in two separate tables. In some examples, ports for SSH, Telnet, File Transfer Protocol (FTP) may be monitored, whereas, ports for Secure Copy Protocol (SCP), Simple Mail Transfer Protocol (SMTP), etc., may not be monitored. In such cases the packet count between IP1→IP2 can be different from aggregate packet counts of the ports being monitored.

Once, the network statistics attributes for the nodes and/or data paths are determined, the values of the network statistics attributes are transmitted to the computing device 204. In an example, when multiple network statistics attributes are determined for multiple nodes and/or data paths, snapshots of the values of the network statistics attributes may be captured. A snapshot is a point in time image of the values of the network statistics attributes for a set of nodes or data paths. Such snapshots may be periodically transmitted to the computing device 204 for further processing. The network manager 206 in the computing device 204 may analyze and process the received snapshots to provide patterns of network usage. In another example, the snapshots may be processed within the network device 202, to obtain patterns of network usage and then the patterns may be forwarded to the network manager 206 in the computing device 204.

In some examples, the snapshots of the network statistics attributes may be stored in the network device 202. Applications of a management plane of the network device 202 may analyze and process the stored snapshots. The management plane refers to architecture within the network device 202 that configures, monitors, and provides management, monitoring and configuration services to, layers of the network stack and other components of the network device 202. In some examples, data from several network devices may be stored and processed in the management plane against application requests.

Figure 5:
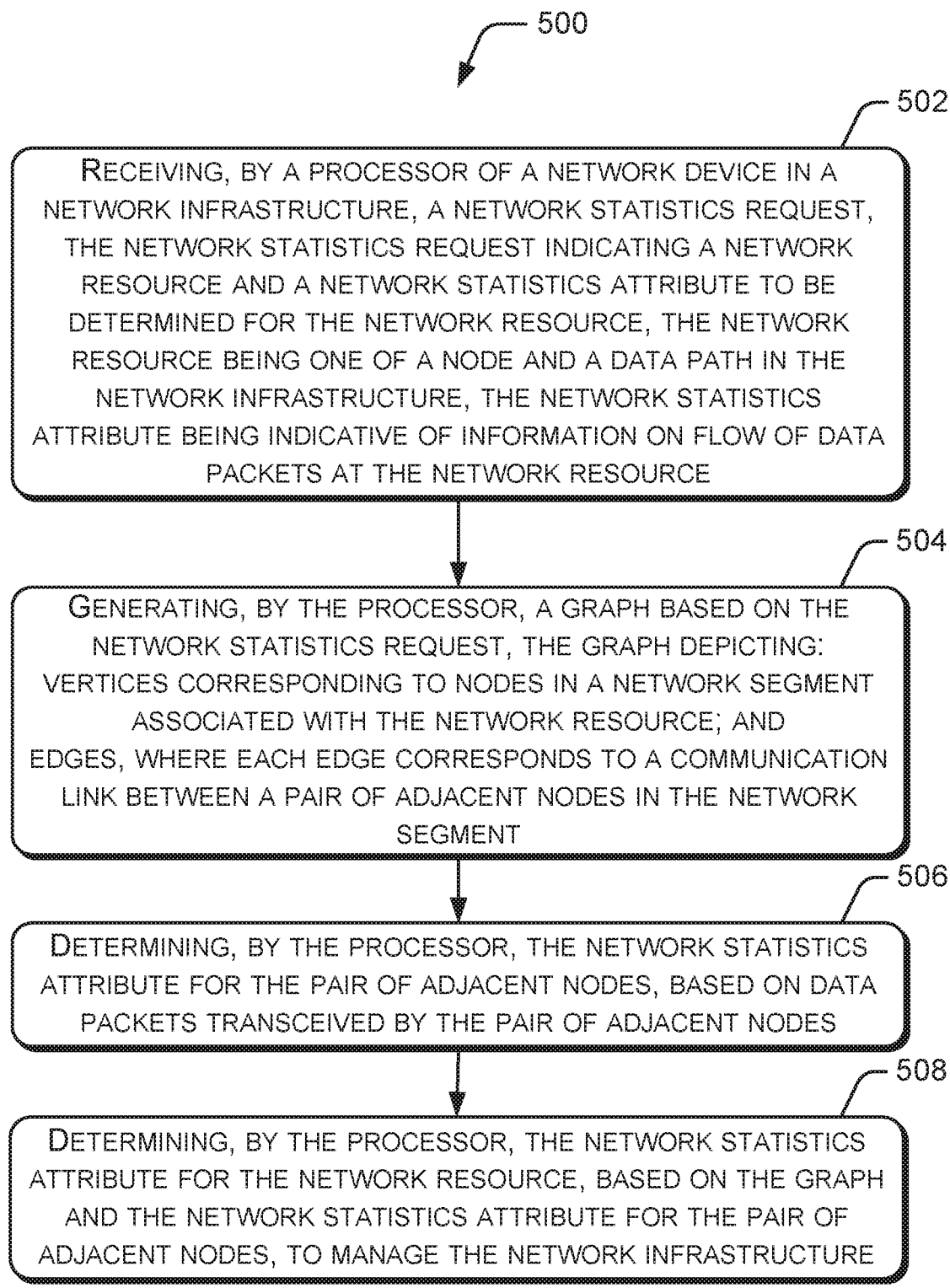
FIG. 5 illustrates a method for managing a network infrastructure, according to an example.

FIG. 5 illustrates a method 500 for managing a network infrastructure, according to an example. The method 500 can be implemented by processing resource(s) or computing device(s) through any suitable hardware, a non-transitory machine readable medium, or combination thereof. In an example, some steps of the method 500 may be performed by a graph generation module, such as the graph generation module 216 and a count computation module, such as the count computation module 218 which include instructions stored on a medium and executable by a processing resource, such as the processor 102, of a network device, such as the network device 100 or 202. Further, although the method 500 is described in context of the aforementioned network device 100 or 202, other suitable systems may be used for execution of the method 500. It may be understood that processes involved in the method 500 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

Referring to FIG. 5, at block 502, a network statistics request is received by a processor of a network device in the network infrastructure. In an example, the network statistics request may be received from a computing device. The network device may be similar to the network device 100 or 202. The computing device may be similar to the computing device 204. The network statistics request indicates a network resource for which a network statistics attribute is to be determined. In some examples, the network resource may be at least one of a node and a data path, in a layer of network stack in the network infrastructure, for which a network statistics attribute is to be determined. In other examples, the network resource may be a broadcast domain, say a specific VLAN. A node is a connection point in a computer network that can receive, create, store or send data along distributed routes in the computer network. A data path may be a connected route between two nodes through which data packets may be transferred. The layer refers to an abstraction layer in the network stack or protocol stack implemented in the network infrastructure. Examples of the layer include a datalink layer, a network layer, and a transport layer of the Open System Interconnections (OSI) model. In an example, the network statistics request may be generated based on a user input in a network infrastructure management platform implemented in the computing device.

The network statistics attribute is indicative of information on flow of data packets at the network resource. The information may be one of number of data packets transceived by the node and number of data packets transferred over the data path. Examples of network statistics attribute includes received data packets, transmitted data packets, broadcast data packets received, multicast data packets received, dropped data packets, number of jumbo frames received, etc. In some examples, prior to receiving the network statistics request, the network device may be configured to manage one network resource or more than one network resources, also referred to as managed network resources. The network statistics request may indicate the managed network resources for which network statistics attributes are to be determined.

At block 504 a graph may be generated based on the network statistics request. The graph depicts vertices corresponding to nodes in a network segment associated with the network resource and edges, where each edge corresponds to a communication link between a pair of adjacent nodes in the network segment. In an example, the network segment may be a broadcast domain of a layer in a network stack of the network infrastructure. Examples of the network segment include a VLAN and an IP subnet. The graph may provide a relationship between nodes in the network segment. The graph may be implemented using an adjacency matrix or adjacency list. In an example, the graph may be updated for subsequent network statistics request(s) or based on changes in the network infrastructure, such as creation and/or deletion of additional nodes, data paths, and network segments.

At block 506, the network statistics attribute for the pair of adjacent nodes is determined based on data packets transceived by the pair of adjacent nodes. In an example, a counter may be associated with a network statistics attribute of a pair of adjacent nodes. The counter may contain a value which provides a quantitative measure of the network statistics attribute for the pair of adjacent nodes. In an example, when the source and destination address of a data packet received at the network resource matches the addresses of the pair of adjacent nodes the value of the counter may be updated.

Based on the graph and the network statistics attribute for the pair of adjacent nodes, the network statistics attribute for the network resource is determined, at block 508. The network statistics attribute determined for the network resource may be provided to a computing device, such as the computing device 204 which can manage the network infrastructure using the value of the network statistics attribute.

Figure 6:
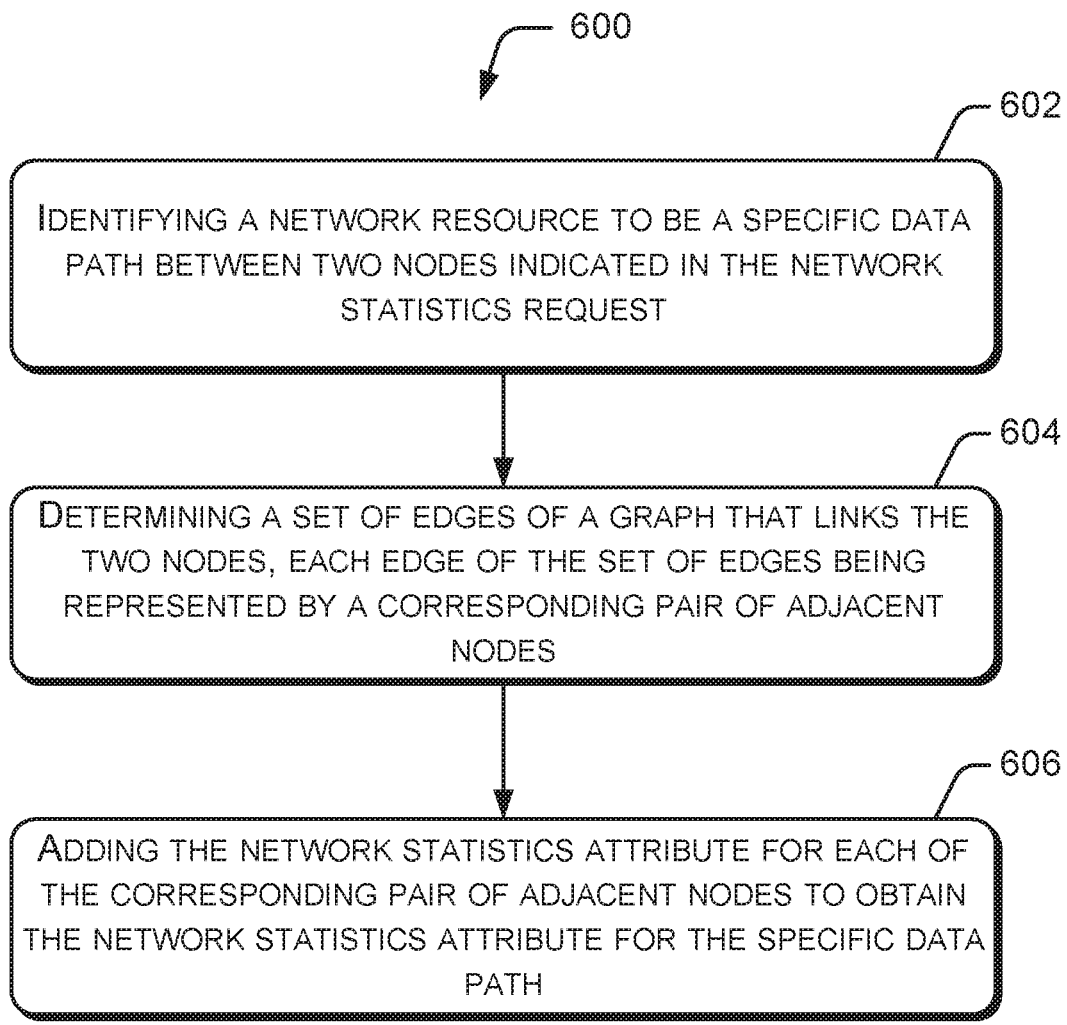
FIG. 6 illustrates a method for determining the network statistics attribute when a specific data path is indicated in a network statistics request, according to an example.

FIG. 6 illustrates a method 600 for determining the network statistics attribute when a specific data path is indicated in a network statistics request, according to an example. In an example, steps of the method 600 may be performed by a graph generation module, such as the graph generation module 216 and a count computation module, such as the count computation module 218.

In an example, a network statistics request may indicate a specific data path, represented by two nodes, for which a network statistics attribute is to be determined. At block 602, the network resource may be identified to be a specific data path between the two nodes. In an example, a graph generation module may identify the network resource as a specific data path by reading the addresses of the two nodes mentioned in the network statistics request. A network segment associated with the two nodes may be identified and a graph of the network segment may be generated. For example, if MAC addresses of two devices are mentioned in the network statistics request, the graph will depict the VLAN under which they are grouped. In another example, if two IP addresses are mentioned in the network statistics request, then the graph may depict the IP subnet under which the two IP addresses are grouped.

At block 604, a set of edges of the graph that links the two nodes are determined. Each edge of the set of edges are represented by a corresponding pair of adjacent nodes At block 606, the network statistics attribute for each of the corresponding pair of adjacent nodes are added to obtain the network statistics attribute for the specific data path. Thus, in an example, a total number of data packet counts between any two nodes may be determined based on the graph and the data packet counts for a pair of adjacent nodes that link the two nodes.

Figure 7:
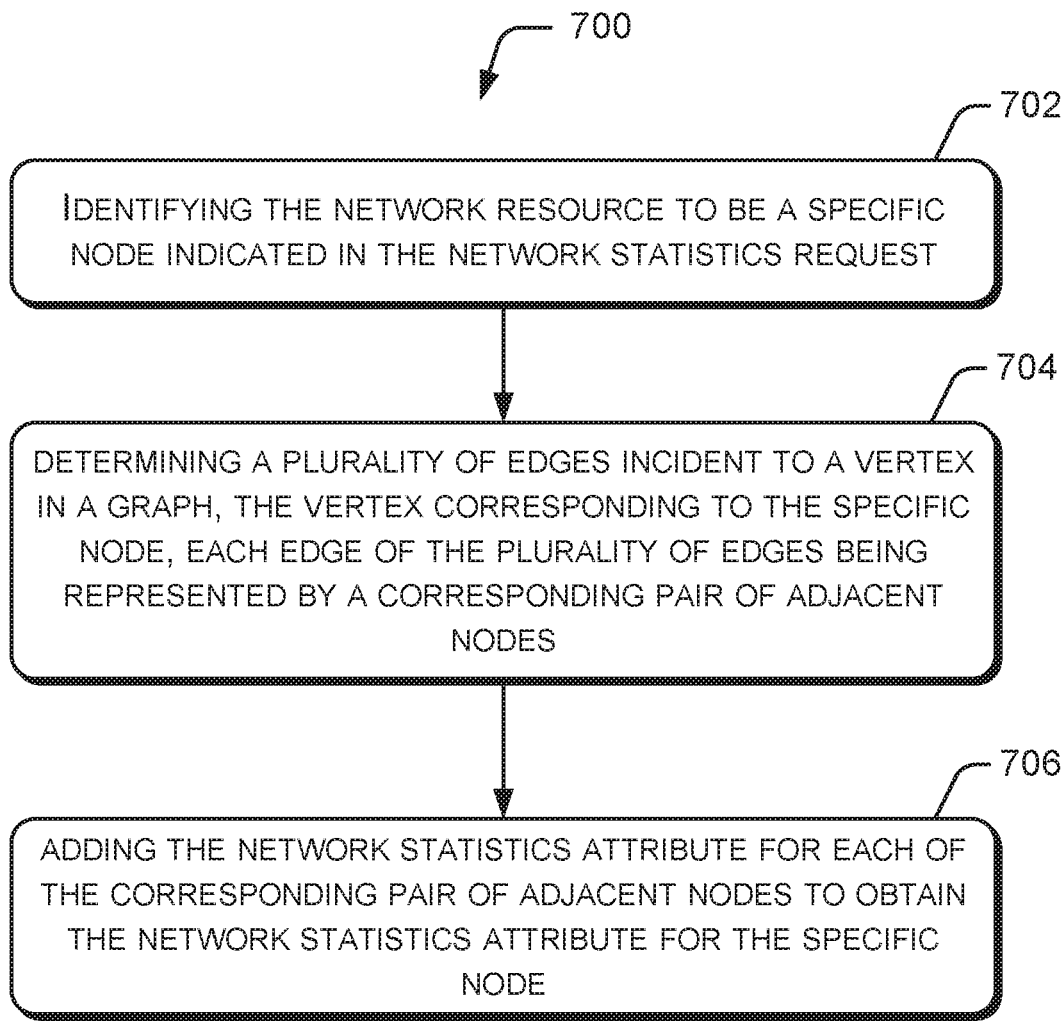
FIG. 7 illustrates a method for determining the network statistics attribute when a specific node is indicated in a network statistics request, according to an example.

FIG. 7 illustrates a method 700 for determining the network statistics attribute when a specific node is indicated in a network statistics request, according to an example. In an example, steps of the method 700 may be performed by a graph generation module, such as the graph generation module 216 and a count computation module, such as the count computation module 218.

In an example, a network statistics request may indicate a specific node, for which a network statistics attribute is to be determined. At block 702, the network resource may be identified to be a specific node as indicated in the network statistics request. A network segment, such as a VLAN or an IP subnet under which the specific node is grouped may be identified from the address of the specific node. A graph may be generated for the network segment associated with the specific node. The vertices of the graph correspond to nodes in the network segment and edges correspond to communication links between adjacent nodes. Thus, the specific node for which the network statistics request is to be determined is also one of the vertices in the graph.

At block 704, a plurality of edges incident to the vertex corresponding to the specific node is determined. Each edge of the plurality of edges being represented by a corresponding pair of adjacent nodes.

At block 706, the network statistics attribute for each of the corresponding pair of adjacent nodes are added to obtain the network statistics attribute for the specific node.

Figure 8:
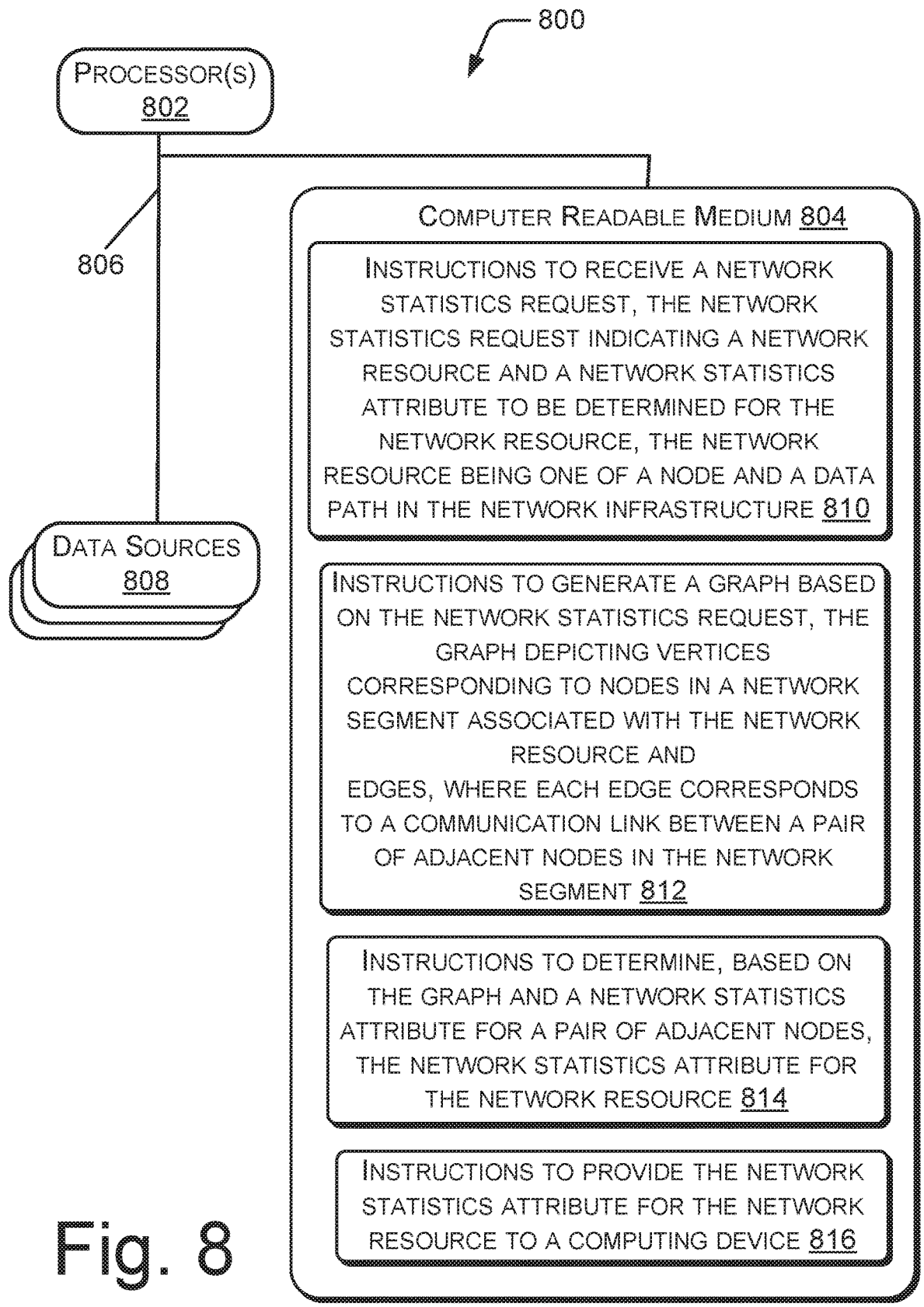
FIG. 8 illustrates a system environment implementing a non-transitory computer readable medium for managing a network infrastructure, according to an example.

FIG. 8 illustrates a system environment 800 implementing a non-transitory computer readable medium for managing a network infrastructure, according to an example.

In an example, the system environment 800 includes processor(s) 802 communicatively coupled to a non-transitory computer readable medium 804 through a communication link 806. In an example implementation, the system environment 800 may be a network device, such as the network device 100 or 202. In an example, the processor(s) 802 may have one or more processing resources for fetching and executing computer-readable instructions from the non-transitory computer readable medium 804.

The non-transitory computer readable medium 804 can be, for example, an internal memory device or an external memory device. In an example implementation, the communication link 806 may be a direct communication link, such as any memory read/write interface.

The processor(s) 802 and the non-transitory computer readable medium 804 may also be communicatively coupled to data sources 808 over the network. The data sources 808 can include, for example, memory of the system, such as the network device 100 or 202.

In an example implementation, the non-transitory computer readable medium 804 includes a set of computer readable instructions which can be accessed by the processor(s) 802 through the communication link 806 and subsequently executed to perform acts for managing a network infrastructure, such as the network infrastructure 200.

Referring to FIG. 8, in an example, the non-transitory computer readable medium 804 includes instructions 810 that cause the processor(s) 802 to receive a network statistics request from a computing device, such as the computing device 204. The network statistics request indicates a network resource for which a network statistics attribute is to be determined. The network resource may be one of a node and a data path, in a layer of a network stack in the network infrastructure. In an example, the network statistics request may be generated based on a user input in a network infrastructure management platform implemented in the computing device. The network statistics attribute is indicative of information on flow of data packets at the network resource.

The non-transitory computer readable medium 804 includes instructions 812 that cause the processor(s) 802 to generate a graph based on the network statistics request. The graph depicts vertices corresponding to nodes in a network segment associated with the network resource and edges, where each edge corresponds to a communication link between a pair of adjacent nodes in the network segment. In an example, the network segment may be a broadcast domain of a layer in a network stack implemented in the network infrastructure. The graph may be implemented using one of an adjacency list and an adjacency matrix.

The non-transitory computer readable medium 804 includes instructions 814 that cause the processor(s) 802 to determine, based on the graph and a network statistics attribute for a pair of adjacent nodes, the network statistics attribute for the network resource. In an example, the network statistics attribute for the pair of adjacent nodes may be determined based on data packets transceived by the pair of adjacent nodes. In an example, counters may be associated with the pair of adjacent nodes for determining the network statistics attribute for the pair of adjacent nodes.

The non-transitory computer readable medium 804 includes instructions 816 that cause the processor(s) 802 to provide the network statistics attribute for the network resource to a computing device implementing a management platform for the network infrastructure. In an example, the computing device may implement a converged infrastructure management platform which can manage the network infrastructure using the network statistics attribute.

In an example, the non-transitory computer readable medium 804 may include instructions that cause the processor(s) 802 to execute a method, such as the method 600, for determining the network statistics attribute when a specific data path is indicated in a network statistics request. In another example, the non-transitory computer readable medium 804 may include instructions that cause the processor(s) 802 to execute a method, such as the method 700, for determining the network statistics attribute when a specific node is indicated in a network statistics request.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
   receiving, by a processor of a network device in a network infrastructure, a network statistics request, the network statistics request indicating a network resource and a network statistics attribute to be determined for the network resource, the network resource being one of a node and a data path in the network infrastructure, the network statistics attribute being indicative of information on flow of data packets at the network resource;
   generating, by the processor, a graph based on the network statistics request, the graph depicting:
      vertices corresponding to nodes in a network segment associated with the network resource; and
      edges, wherein each edge corresponds to a communication link between a pair of adjacent nodes in the network segment;
   determining, by the processor, the network statistics attribute for the pair of adjacent nodes, based on data packets transceived by the pair of adjacent nodes; and
   determining, by the processor, the network statistics attribute for the network resource, based on the graph and the network statistics attribute for the pair of adjacent nodes, to manage the network infrastructure,
   wherein determining the network statistics attribute for the network resource comprises:
      identifying the network resource to be a specific data path between two nodes indicated in the network statistics request;
      determining a set of edges of the graph that links the two nodes, each edge of the set of edges being represented by a corresponding pair of adjacent nodes; and
      adding the network statistics attribute for each of the corresponding pair of adjacent nodes to obtain the network statistics attribute for the specific data path.

2. The method as claimed in claim 1, wherein the network statistics request is received from a computing device implementing a network infrastructure management platform, the network statistics request being based on a user input in the network infrastructure management platform.

3. The method as claimed in claim 1, wherein the network segment is a broadcast domain of a layer in a network stack implemented in the network infrastructure.

4. The method as claimed in claim 1, wherein the graph is generated using one of an adjacency list and an adjacency matrix.

5. The method as claimed in claim 1, wherein the network statistics attribute includes one of transceived data packets, transceived traffic volume, and transceived data frames.

6. A network device comprising:
   a processor; and
   a memory coupled to the processor, the memory storing instructions executable by the processor to:
   receive a network statistics request, the network statistics request indicating a network resource and a network statistics attribute to be determined for the network resource, the network resource being one of a node and a data path in the network infrastructure, the network statistics attribute being indicative of information on flow of data packets at the network resource;
   generate a graph based on the network statistics request, the graph depicting:
      vertices corresponding to nodes in a network segment associated with the network resource; and
      edges, wherein each edge corresponds to a communication link between a pair of adjacent nodes in the network segment; and
   determine, based on the graph and a network statistics attribute for a pair of adjacent nodes, the network statistics attribute for the network resource, to manage the network infrastructure, the network statistics attribute for the pair of adjacent nodes being determined based on data packets transceived by the pair of adjacent nodes,
   wherein to determine the network statistics attribute for the network resource, the processor is to:
   identify the network resource to be a specific node indicated in the network statistics request;
   determine a plurality of edges incident to a vertex in the graph, the vertex corresponding to the specific node, each edge of the plurality of edges being represented by a corresponding pair of adjacent nodes; and
   add the network statistics attribute for each of the corresponding pair of adjacent nodes to obtain the network statistics attribute for the specific node.

7. The network device as claimed in claim 6, wherein the network statistics request is received from a computing device implementing a network infrastructure management platform, the network statistics request being based on a user input in the network infrastructure management platform.

8. The network device as claimed in claim 6, wherein the network segment is a broadcast domain of a layer in a network stack implemented in the network infrastructure.

9. The network device as claimed in claim 6, wherein the graph is generated using one of an adjacency list and an adjacency matrix.

10. The network device as claimed in claim 6, wherein the network statistics attribute includes one of transceived data packets, transceived traffic volume, and transceived data frames.

11. The network device as claimed in claim 6, wherein the network device is one of a network switch and an interconnect switching module (ICM).

12. A non-transitory computer-readable medium comprising computer-readable instructions for managing a network infrastructure, the computer-readable instructions when executed by a processor, cause the processor to:
- receive a network statistics request, the network statistics request indicating a network resource and a network statistics attribute to be determined for the network resource, the network resource being one of a node and a data path in the network infrastructure, the network statistics attribute being indicative of information on flow of data packets at the network resource;
- generate a graph based on the network statistics request, the graph depicting:
  - vertices corresponding to nodes in a network segment associated with the network resource;
  - edges, wherein each edge corresponds to a communication link between a pair of adjacent nodes in the network segment;
- determine, based on the graph and a network statistics attribute for a pair of adjacent nodes, the network statistics attribute for the network resource, the network statistics attribute for the pair of adjacent nodes being determined based on data packets transceived by the pair of adjacent nodes; and
- provide the network statistics attribute for the network resource to a computing device implementing a management platform for the network infrastructure,
- wherein the instructions to determine the network statistics attribute for the network resource when executed by the processor, cause the processor to:
- identify the network resource to be a specific node indicated in the network statistics request;
- determine a plurality of edges incident to a vertex in the graph, the vertex corresponding to the specific node, each edge of the plurality of edges being represented by a corresponding pair of adjacent nodes; and
- add the network statistics attribute for each of the corresponding pair of adjacent nodes to obtain the network statistics attribute for the specific node.

13. The non-transitory computer-readable medium as claimed in claim 12, wherein the network segment is a broadcast domain of a layer in a network stack implemented in the network infrastructure.

14. The non-transitory computer-readable medium as claimed in claim 12, wherein the graph is generated using one of an adjacency list and an adjacency matrix.

* * * * *